Aug. 2, 1955

T. R. BAKER 2,714,343

DEVICES FOR ASSEMBLING FLAT BOX BLANKS
INTO HOLLOW FOLDING BOXES

Filed Aug. 3, 1953

INVENTOR.
Thomas R. Baker
BY
Howard G. Russell
his ATTORNEY

Aug. 2, 1955

T. R. BAKER 2,714,343

DEVICES FOR ASSEMBLING FLAT BOX BLANKS
INTO HOLLOW FOLDING BOXES

Filed Aug. 3, 1953

INVENTOR.
Thomas R. Baker
BY
Howard G. Russell
his ATTORNEY

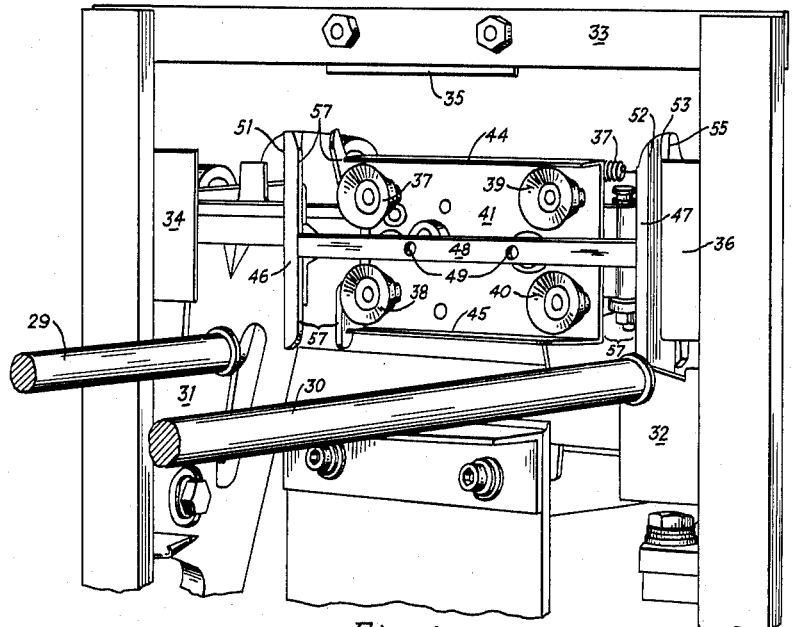

Aug. 2, 1955 T. R. BAKER 2,714,343
DEVICES FOR ASSEMBLING FLAT BOX BLANKS
INTO HOLLOW FOLDING BOXES
Filed Aug. 3, 1953 10 Sheets-Sheet 4

INVENTOR.
Thomas R. Baker
BY Howard G. Russell
his ATTORNEY

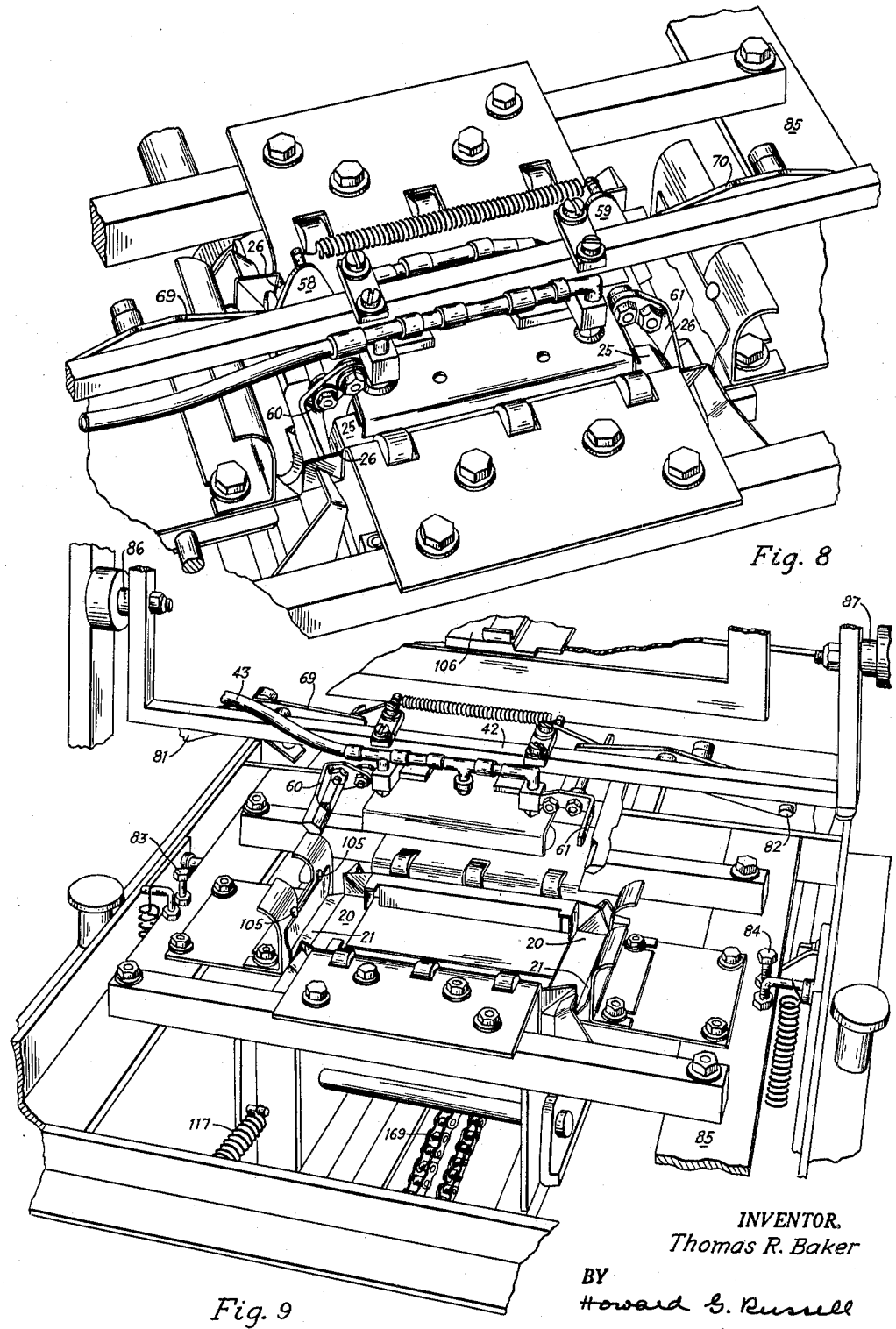

INVENTOR.
Thomas R. Baker
BY Howard G. Russell
his ATTORNEY

INVENTOR.
Thomas R. Baker
BY Howard G. Russell
his ATTORNEY

Aug. 2, 1955 T. R. BAKER 2,714,343
DEVICES FOR ASSEMBLING FLAT BOX BLANKS
INTO HOLLOW FOLDING BOXES
Filed Aug. 3, 1953 10 Sheets-Sheet 9

INVENTOR.
Thomas R. Baker
BY Howard G. Russell
his ATTORNEY

United States Patent Office 2,714,343
Patented Aug. 2, 1955

2,714,343

DEVICES FOR ASSEMBLING FLAT BOX BLANKS INTO HOLLOW FOLDING BOXES

Thomas R. Baker, Los Altos, Calif., assignor, by mesne assignments, to Baljak Corporation, Wilmington, Del., a corporation of Delaware Application August 3, 1953, Serial No. 371,883

9 Claims. (Cl. 93—49)

This invention relates to improvements in devices for assembling flat box blanks into hollow folding boxes, and relates particularly to devices for setting up hollow walled boxes.

In the assembly of hollow walled folding boxes by mechanical means considerable difficulties are experienced in the formation of the hollow box walls last completed. For reasons of simplicity these walls may be referred to as end walls. The folding of a flat box blank into hollow box form may be considered as involving the step of first erecting the box side walls, followed by the step of forming the box end walls. The second step generally involves the completion or locking of the box corners so that a rigid box structure is eventually formed.

Boxes having side walls and end walls of single-ply thickness without an air space between the plies usually do not offer appreciable problems.

However, where there are air spaces in the walls, for example where the walls are of triangular or rectangular cross section, the assembly of the walls involves difficulties which, as far as I am aware, restricted in the past, assembly of hollow walled boxes to manual operations. The patent application of Randles, Serial No. 322,610, filed November 26, 1952, discloses a preferred form of box having hollow walls of rectangular cross-section.

Assembly of box blanks by hand is necessarily time consuming and expensive. It limits the use of hollow walled boxes to fields where the correspondingly high cost of the boxes is justified.

The present invention provides an automatic mechanism for assembling hollow end walls on partially assembled box blanks of which the side walls are already formed.

It does not matter in this connection by what particular mechanical means the box side walls were erected. They may be erected on an automatic folding machine of the conveyor type, or they may be erected by a device of the plunger and die type as disclosed in my copending application Serial No. 371,977, filed August 3, 1953. The latter type of machine is a universal machine which offers the advantage of small size, relatively low cost, and offers the feature of being changed-over rapidly and inexpensively from one box size to another.

Machines of the former type are single purpose machines, generally designed to handle box blanks of a single size and are not very adaptable to changes in box size.

In either case, the partially assembled box blank is held between plates or surfaces which maintain the side walls upright at the time the assembly of the end walls is carried out.

The formation of the end walls involves folding a group of end wall panels along spaced fold lines, whereby certain panels are moved into new positions differing as much as 270 degrees and even 360 degrees from the position which the panels originally had in the flat blank. Furthermore certain panels are moved into spaced positions with respect to other panels.

The various aims, objects and advantages of this invention will appear more fully from the detailed descriptions which follow, accompanied by drawings showing, for the purpose of illustration, a preferred embodiment of the invention. The invention also resides in certain new and original features of construction, combination and sub-combination of elements as hereinafter set forth and claimed.

Although the characteristic features of this invention which are believed to be novel will be particularly pointed out in the claims appended hereto, the invention itself, its objects and advantages, and the manner in which it may be carried out, may be better understood by referring to the following description taken in connection with the accompanying drawings forming a part of it, in which:

Fig. 4 is a perspective view of a blank magazine and feeder of a plunger-and-die machine for setting up the box side walls, the view being towards the bottom surface of the feeder.

Fig. 5 is a perspective view of the magazine and feeder of Fig. 4, looking in the opposite direction, the magazine being filled with box blanks;

Fig. 8 is a perspective view of the feeder-plunger and the die at a further advanced stage of the assembly;

Fig. 9 is a perspective view of a die after withdrawal of the feeder-plunger, and prior to engagement of the blank by a second plunger;

Figure 1:
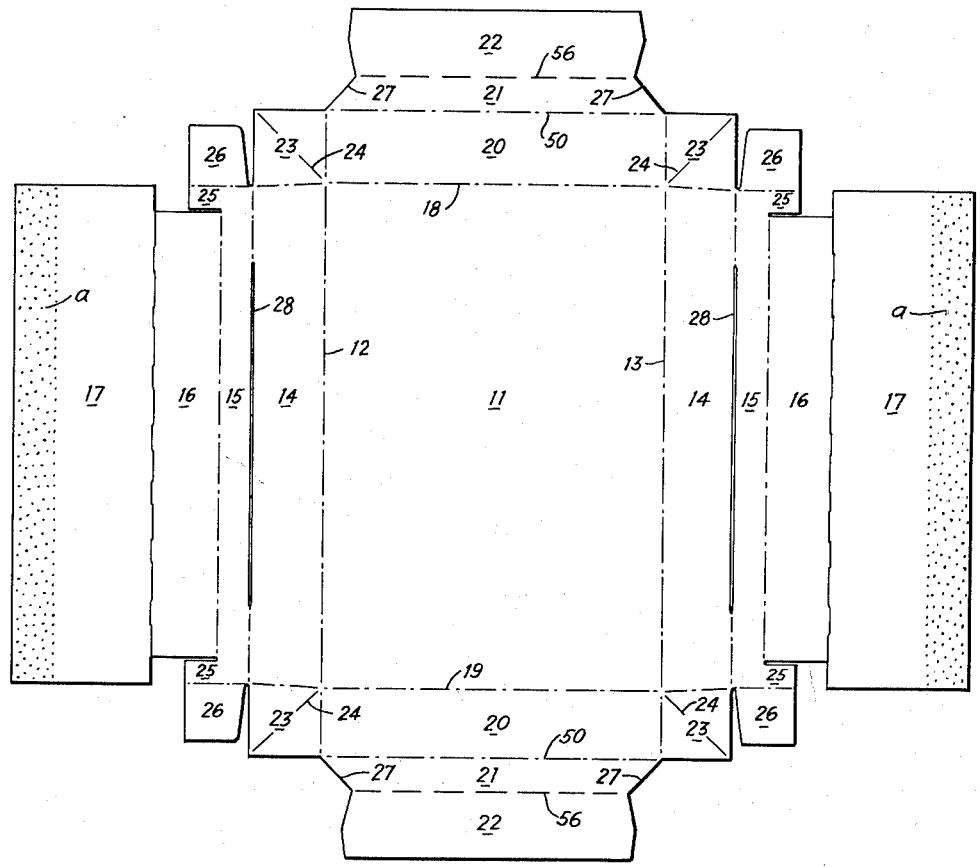
Fig. 1 is a plan view of a preferred form of box blank for a hollow walled folding box.

In the following description and in the claims various details will be identified by specific names for convenience. The names however, are intended to be generic in their application. Corresponding reference numerals refer to corresponding parts in the several figures of the drawings.

The drawings accompanying, and forming, part of this specification disclose certain specific details of the invention for the purpose of explanation of broader aspects, but it is understood that the details may be modified in various respects without departure from the broader aspects of the invention, and that the invention may be applied to other structures than the one shown.

The blank A shown in Fig. 1 is a preferred form of blank for constructing hollow-walled folding boxes and forms the subject matter of the aforementioned patent application by Randles, Serial No. 322,610, filed November 26, 1952. The blank A comprises a main panel 11, to the side edges 12 and 13 of which side wall assemblies are articulated. The side wall assemblies comprise an outer side wall panel 14, a side top panel 15, an inner side wall panel 16 and a glue flap 17.

End wall assemblies extend from the end edges 18 and 19 of the main panel. These end wall assemblies comprise an outer end wall panel 20, and end top panel 21 and an inner end panel 22.

Gusset panels 23 are articulated to the outer side wall panels and to outer end wall panels, respectively, each gusset panel being bisected by a diagonal score line 24.

The side top panels 15 are provided with angular extensions 25. These extensions, as will later be seen, underlie the end top panels 21 in the finished box. The angular extensions 25 preferably have reinforcing and stiffening flaps 26 articulated to them. The end edges of the end top panels 21 are preferably mitered, as shown in 27 for the sake of appearance.

Figure 2:
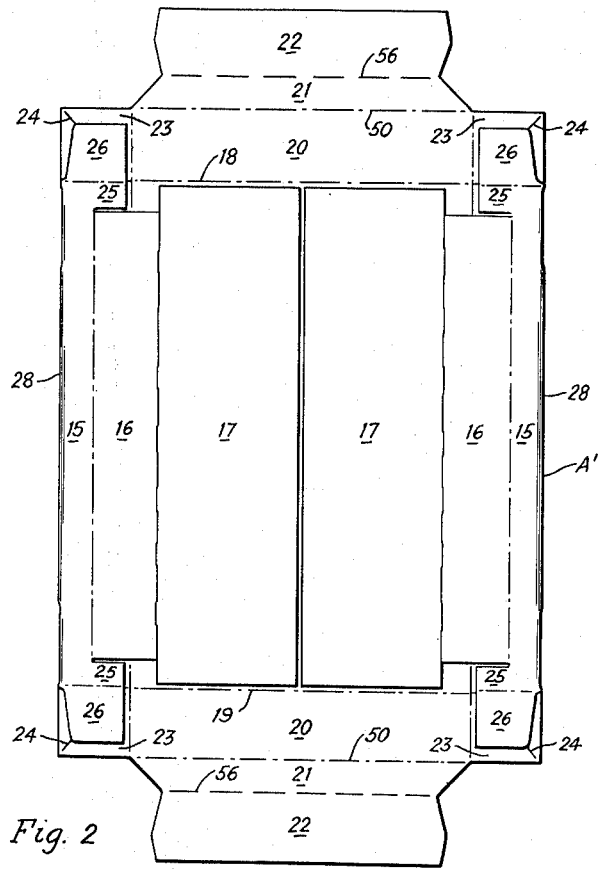
Fig. 2 is a plan view of a blank of Fig. 1 after an initial folding and gluing operation resulting in a flat blank structure ready for assembly into box form.

The cut and scored blanks are preferably pre-folded and pre-glued to produce the flat blank of Fig. 2. For this purpose adhesive "a" is applied to the glue flaps 17, as indicated in Fig. 1 and the blank is then folded along the crease lines 28 to bring the glue flaps 17 face to face, and into adhesive engagement with, the main panel 11. The resulting blank A' is partially of double thickness and is shown in Fig. 2. The portion of the blank which later forms the inside of the box faces the observer.

The blanks A' may be shipped and stored in collapsed flat condition and are ready for immediate assembly into hollow box form by an automatic folding box machine whose essential elements will now be described.

The invention is illustrated in its association with a general purpose folding box machine of the plunger-and-die type. Details of the design of the machine are disclosed in the patent to Baker and Pagendarm 2,624,249 dated January 6, 1953. The machine may be equipped with a practically frictionless blank magazine and suction feeder as disclosed in the patent to Baker and Pagendarm No. 2,642,285, dated June 16, 1953.

Fig. 4 illustrates an empty blank magazine which comprises oscillating rods 29 and 30 for supporting box blanks. The rods are pivotally mounted in brackets 31 and 32 of magazine gate 33. The magazine gate has retaining blades 34, 35, 36 extending slightly into the path of blanks stacked on the rods 29 and 30 to prevent the frontmost blank from falling out of the gate.

Turning now to Fig. 5 a stack of blanks A' is shown in the magazine, and it is seen how the blades 34, 35 and 36 engage the frontmost blank adjacent the edges and keep it securely within the magazine, yet permitting individual withdrawal of the frontmost blank in a manner which will now be described.

The blank feeder comprises one or several suction cups adapted to engage the frontmost blank in the stack and pull it past the edges of the blades 34, 35 and 36 by flexing the blanks slightly as seen in Fig. 5. The illustrated form of feeder has four suction cups 37, 38, 39 and 40. These suction cups are mounted on a plate 41 secured to an arm 42 capable of swinging between the magazine and a folding die forming part of the machine. The mechanism for actuating the swinging arm 42 is disclosed in greater detail in the aforementioned Baker and Pagendarm Patent 2,624,249. The suction cups are connected to a suitable suction pump (not shown) by a flexible hose 43 best seen in Fig. 5.

Turning to Fig. 4, the suction feeder also performs the function of a plunger for forcing the box blank into a forming die hereinafter described in greater detail. For this purpose the plate 41 is bent into a flat U-shape, the legs of the U forming two side rails or edges 44 and 45 adapted to bear against the blank adjacent the fold lines along which the glue flaps 17 are articulated to the inner side wall panels 16. It is therefore apparent that the distance between the side rails or edges 44 and 45 is slightly less than the distance between the inner side walls of the finished box.

The feeder-plunger is further equipped with end rails 46 and 47. In the illustrated embodiment the end rails 46 and 47 are welded to a central bar 48 to which the plate 41 is secured by bolts. As will later be seen, the end rails 46 and 47 serve to pre-break certain creases of the end panels of the box blank.

The end rails 46 and 47 are longer than the distance between the side rails 44 and 45, as is clearly apparent from Fig. 4. As is seen from Fig. 5, the end rails 46 and 47 engage the outer end wall panels 20 and the end top panels 21 of the blank adjacent the line of articulation 50 between these two panels.

The central bar 48 and a portion of the end rails 46 and 47 constitute a substantially flat, blank engaging surface extending to edges 51 and 52 beyond which the bottom surface of the end rails tapers upwardly, thereby forming a flat surface 53 inclined with respect to the bottom surface of the central bar 48. The spacing of the edges 51 and 52 is substantially equal to the spacing of the lines of articulation 50 of the blank. This arrangement permits the edges 51 and 52 to act as folding guides facilitating the accurate creasing of the blank along the fold lines 50 during the subsequent assembly procedure.

The end rails 46 and 47 are further provided with terminal edges 55 at the end of the inclined surface 53. The edge 55 lines up with the fold line 56 along which the panels 21 and 22 of the blank are articulated.

The length of the end rails 46 and 47 is greater than the distance between the side rails 44 and 45, and the end rails 46 and 47 are spaced apart farther than the length of the side rails 44 and 45. This arrangement leaves recesses or spaces 57 between the side rails and the end rails. As is apparent from Figures 7 and 8, the recesses 57 are in line with the angular extensions 25 of the side top panels 15, and permit erection of the side wall structures without interference to the angular extensions 25 by the feeder-plunger. Since the angular extensions 25 are in line with the end top panels 21 in the finished box, it may also be stated that the recesses 57 are in line with the end top panels 21, considering the box in erected position.

Folding arms 58, 59, 60 and 61 are pivotally mounted on the feeder-plunger for swinging movement about axes 62 and 63.

One end of the folding arms is angularly bent as shown at 64, 65, 66 and 67. The angularly bent ends of the folding arms are movable into the respective recesses 57 and serve to engage the reinforcing flap 26 on the angular extensions, as will later be seen.

Normally, the folding arms 58, 59, 60, 61 are maintained in raised position by a biasing spring 68. They may be swung in a downward direction toward the plate 41 by double-armed actuating levers 69 and 70 pivoted at 71 and 72 on the oscillating arm 42. The inner arms 73 and 74 of the actuating levers 69 and 70 engage connecting bars 75 and 76 of the folding arms 58, 60 and 59, 61, the connecting bars being fitted with ball bearings 77 and 78 on which the inner arms 73 and 74 rest.

The outer ends 79 and 80 of the actuating levers 69 and 70 carry studs 81 and 82 (Fig. 9) for engagement with posts 83 and 84 on the framework 85 on which the die assembly is mounted. As the oscillating arm 42 moves towards the die, the studs 81 and 82 strike the posts 83 and 84 and cause the actuating levers 69 and 70 to tilt about the respective pivots, thereby moving the folding arms 58, 59, 60 and 61 downwardly.

When the feeder-plunger is retracted from the die, the biasing spring 68 swings the folding arms 58, 59, 60 and 61 back into the position shown in Fig. 5.

The feeder-plunger performs a relatively complex movement between the magazine gate and the folding die which may be subdivided into three phases.

The first phase is a translatory motion in which the plunger approaches the magazine gate substantially in the direction of the stack of blanks resting in the magazine. At the end of this motion the suction cups grasp the frontmost blank, whereafter the feeder-plunger retracts, thereby pulling the frontmost blank past the retaining blades 34, 35 and 36, as shown in Fig. 5.

During the second phase of motion of the feeder-plunger the oscillating bar 42 swings or oscillates about pivots 86 and 87 (Fig. 9) until the feeder-plunger is in line with the folding die.

During the third phase of motion, the feeder-plunger performs a translatory motion into and out of the folding die.

The mechanism for imparting this complex motion to the feeder-plunger is disclosed in greater detail in the aforementioned Baker and Pagendarm Patent 2,624,249.

Figure 6:
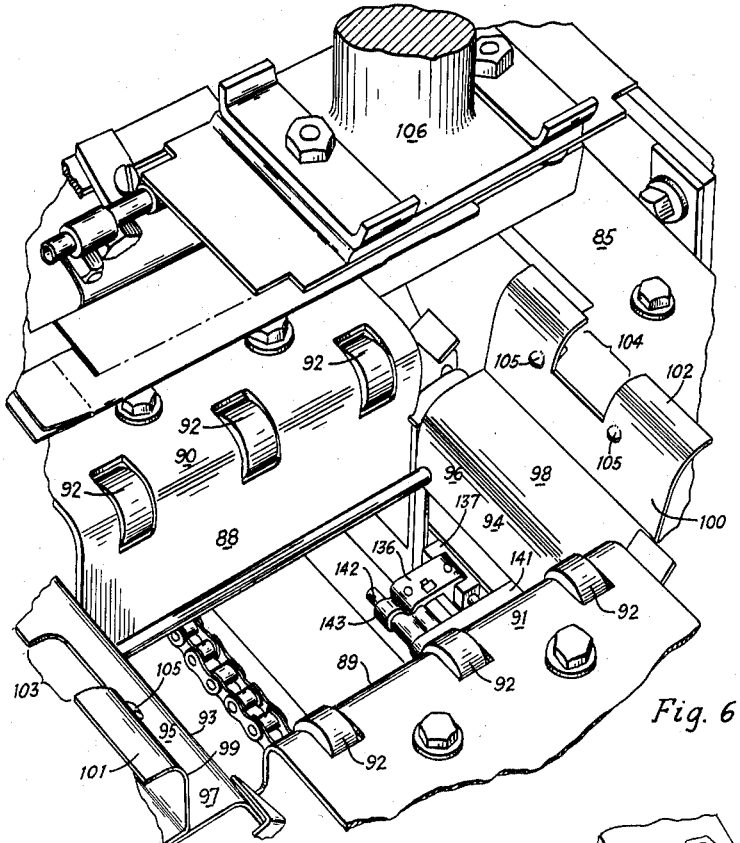
Fig. 6 is a perspective view of a die for setting up the box side walls, certain elements of the end wall folding mechanism being visible in the throat of the die.

The principal elements of the folding die are best seen in Fig. 6. The die comprises a pair of opposed substantially vertical die walls 88 and 89 for engaging the side wall assemblies of the box blank. The die walls are outwardly flared at 90 and 91 at the mouth of the die and rollers 92 serve to reduce the friction between the mouth of the die and an entering box blank.

A second pair of opposite die walls 93 and 94 serves to engage the end wall assemblies of the box blank. The die walls 93 and 94 proper are flared at 95 and 96 and terminate in a substantially horizontal shelf at 97 and 98 upon which certain panels of the box blank rest during the assembly as will later be seen.

For the shelves 97 and 98 substantially vertical die wall portions 99 and 100 extend upwardly. The die elements 99 and 100 are flared at 101 and 102 to provide a mouth for the die walls 99 and 100. The flared portions are cut out at 103 and 104 to accommodate the oscillating arm 42 of the feeder-plunger in its lowermost position. Retaining buttons 105 are fitted in the outer die elements 99 and 100 to engage the outer edges of a partially inserted box blank to prevent the box blank from snapping out of the die during the return movement of the feeder-plunger, as will later be seen.

The die walls 88 and 89 which engage the side wall assemblies of the box are spaced a distance substantially equal to the distance of the outer side walls of the assembled box.

The die walls 93 and 94 which engage the end wall assemblies of the box are spaced a distance substantially equal to the outer end walls of the box.

The outer die walls 99 and 100 are spaced closer than the length of the blank, that is the distance from one edge of one end wall assembly of the blank to the corresponding edge of the other end wall assembly, considering the box in flat condition.

When the feeder-plunger moves towards the mouth of the folding die, the outer side walls 14 of the blank strike the mouth of the die, more particularly the flared portions 90 and 91 and the friction reducing rollers 92. The blank, which is still held by the suction cups of the feeder-plunger, is further supported by the side rails or edges of the feeder-plunger of which one is visible at 45 in Fig. 7. The side rails or edges engage the blank immediately adjacent the lines along which the inner side panels 16 are articulated to the glue flaps 17. The side edges or rails 44 and 45 cause the inner side walls 16 to assume an upright position with regard to the bottom of the blank and similarly the outer side walls of the blank 14 assume an angular position in regard to the bottom panel 11 of the blank when the blank enters the mouth of the die.

The angular extensions 25 of the blank move into the recesses or spaces 57 of the die between the end rails 46 and 47 and the side rails 44 and 45, respectively.

Figure 7:
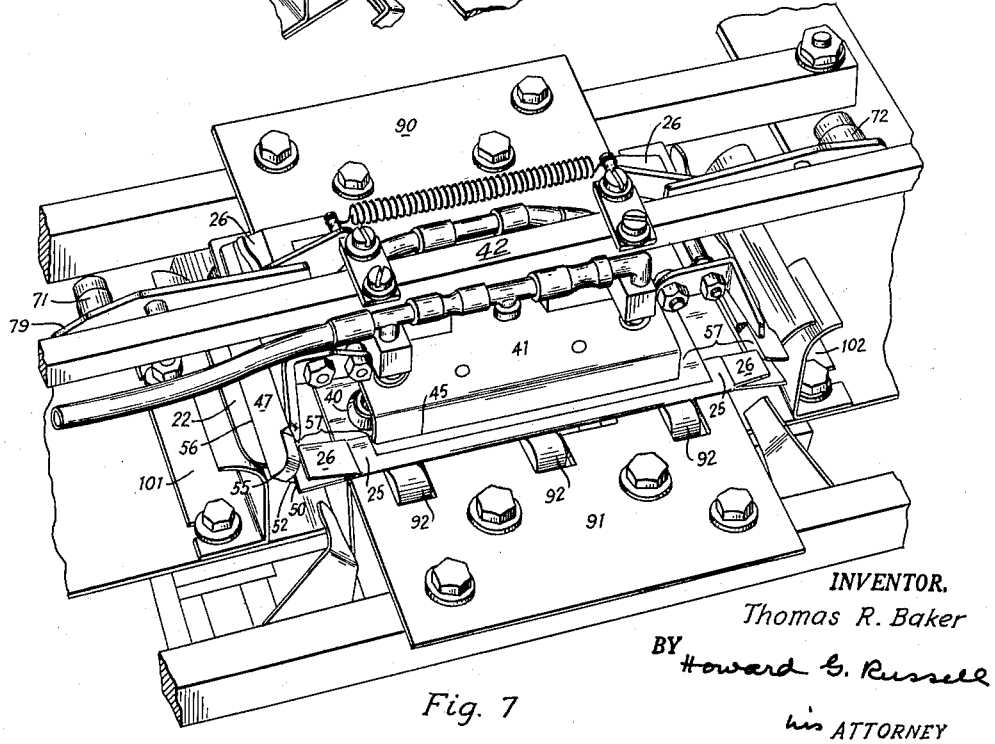
Fig. 7 is a perspective view of the feeder plunger and die during the initial stage of erection of the box blank.

Substantially simultaneously, the inner end panels 22 of the blank strike the flared portions 101 and 102 of the die and are folded to an upwardly slanting position in regard to the bottom of the blank. The edges of the end rails, three edges being visible at 51, 52 and 55 in Fig. 4, engage the fold lines 50 and 56 bordering the end top panel 21 and cause both folding creases to break. Fig. 7 illustrates the position of the blank during the pre-breaking of the folding creases.

As the feeder-plunger approaches the lowest position with respect to the folding die, the side wall assemblies of the box blank are fully squared and erected. During the last portion of this downward stroke, the actuating levers 69 and 70 strike the respective posts 83 and 84 visible in Fig. 9 and cause the folding arms 58, 59, 60 and 61 to swing downwardly, thereby striking the reinforcing flaps 26 and folding them into substantially rectangular positions with regard to the angular extensions 25 from which they depend. Fig. 8 illustrates the position of the arms 58, 59, 60 and 61 in which the reinforcing flaps 26 have almost reached their final position.

The folding of the reinforcing flaps 26 completes the operations performed by the feeder-plunger, which then retracts as shown in Fig. 9. It will be noted that the end edges of the inner end wall panels have snapped past the retaining buttons 105 which lock the blank in the die in a position in which the panels 20 and 21 overlie the aforementioned horizontal shelves 97 and 98 (Fig. 6) of the die.

The feeder-plunger now returns to the magazine to pick up the next blank, and a second plunger 106 descends to perform further folding operations on the blank.

During the period of withdrawal of the feeder-plunger (Fig. 9) and prior to engagement of the blank by the descending second plunger (Fig. 10), the gusset panels 23 of the blank are folded sufficiently to insure proper formation of the corner gussets.

Figure 16:
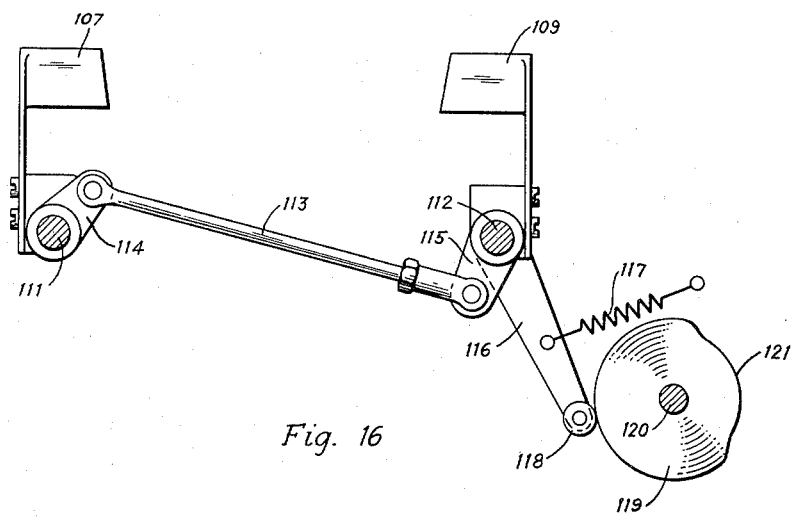
Fig. 16 illustrates the action of the gusset folding mechanism.

For this purpose four folding blades 107, 108, 109 and 110 are provided which engage the gusset panels 23 along their diagonal score lines. The action of the gusset folders is illustrated in Fig. 16.

The folding blades are mounted on shafts 111 and 112 which are interconnected by a rod 113 hingedly connected to cranks 114 and 115 on the shafts 111 and 112, respectively. The shaft 112 has an actuating lever 116 secured to it which is biased for counterclockwise rotation by a spring 117. The end of the lever carries a roller 118 resting against a cam 119 on a shaft 120 which is a part of the machine drive.

Figure 10:
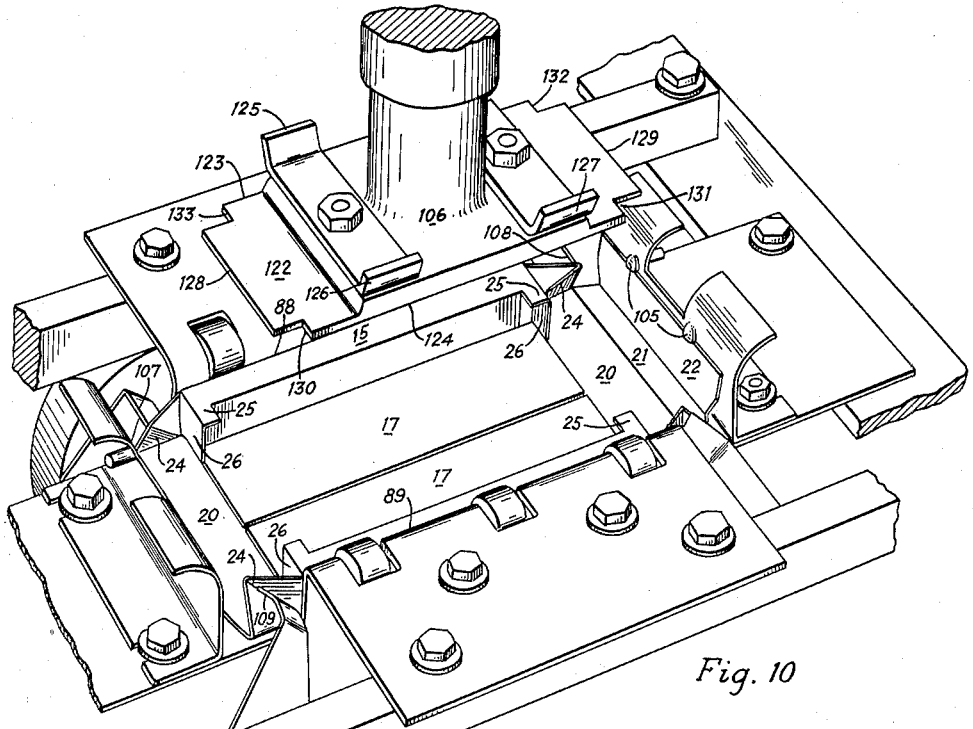
Fig. 10 illustrates the position of the plungers slightly advanced with regard to the position of Fig. 9.

The cam normally maintains the folding blades in disengaged position. When the low portion 121 of the cam bears against the roller, the shaft 112 turns counterclockwise and the shaft 111 turns in the opposite direction under the action of the spring 117. This causes the blades 107, 109 and 108, 110 to move towards each other, thereby initiating the folding of the gusset panels along their diagonal score lines 24. Fig. 10 illustrates this stage of the folding operations and also shows details of the plunger 106 about to engage the partially folded blank in the die.

The plunger 106 comprises a base plate 122 whose side edges 123 and 124 are spaced apart slightly less than the distance between the inner side walls 16 of the partially erected blank. Sufficient clearance is provided to insure that the base plate 122 of the plunger comes to rest on the bottom panel and the overlying glue flaps 17 of the blank without striking the erected side walls.

The plunger is provided with upper box side wall engaging portions or surfaces of which three are visible at 125, 126 and 127. These surfaces taper upwardly and outwardly and their uppermost portions engage the inner side walls 16 of the box adjacent the side top panels 15, as is particularly well shown in Fig. 11. The upper, box side wall engaging, portions of the plunger are spaced from the die walls 88 and 89 a distance which is substantially equal to the thickness of the hollow side walls of the box. This construction of the plunger assures accurate squaring of the side wall structures.

The end edges 128 and 129 of the second plunger 106 are spaced apart a distance which is substantially equal to the length of the bottom panel of the box. The edges 128 and 129 thus engage the blank in the die immediately adjacent the lines along which the outer end wall panels 20 are articulated to the bottom panel and insure accurate folding of the blank along that line.

The four corners of the base plate 122 are cut out, as seen at 130, 131, 132 and 133, the cut-back being sufficient to cause the plunger to clear the four angular extensions 25 on the side top panels 15 safely.

Figure 11:
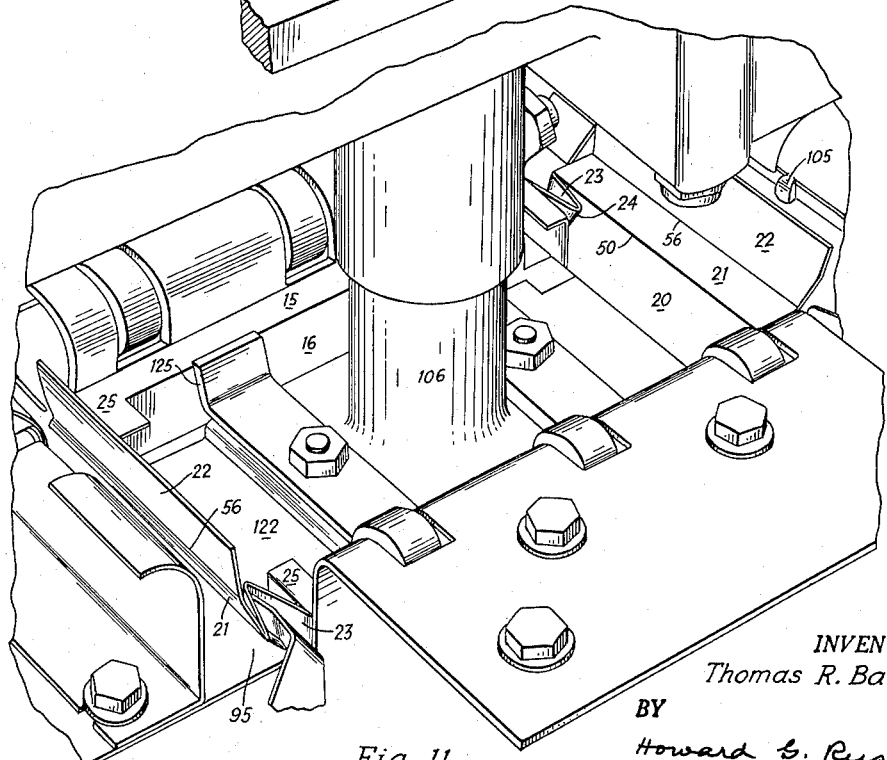
Fig. 11 shows the second plunger in engagement with a blank.
Figure 15:
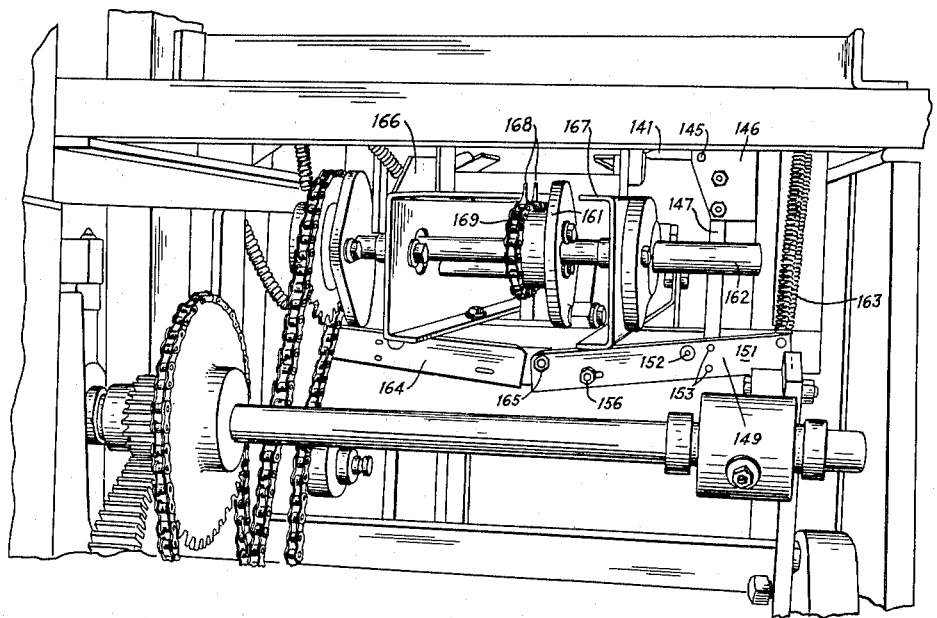
Fig. 15 is a perspective view of that portion of the machine which includes the forming mechanism of Fig. 14.

Fig. 11 illustrates the position of the plunger 106 shortly after engagement with the box blank. At this point the end wall assemblies of the blank are about to enter the mouth of the lower portion of the die. The downward movement of the blank causes the inner end panels 22 to disengage from the retaining button 105. As is apparent from the drawing, the pre-breaking of the fold lines 50 and 56 has caused the panels 20, 21 and 22 to assume a definite angular position with respect to one another. The downward movement of the blank into the lower portion of the die causes the gusset panels 23 to fold tightly, and the blank finally comes to rest on rails 166, 167 (Fig. 15) within the lower portion of the die, whereafter the second plunger 106 recedes. Fig. 11 illustrates this phase of the operation at which the blank is ready for completion of the end wall assemblies by a hollow end walling mechanism associated with the die.

The assembly of the end walls involves folding of the inner end wall panel 22 into a position in which it is upright with respect to the bottom of the box, and spaced from and parallel with the outer end wall panel 20. In this position the end top panel 21 overlies the angular extensions 25 of the side top panels 15.

The folding mechanism includes a pair of oppositely disposed folding blades 134 which are mounted to perform a relatively complex folding operation. This operation is distinct from the common double-walling operations known in the folding box art in that the inner end wall is brought into a position in which it is parallel with, but spaced from, the outer end wall.

Figure 14:
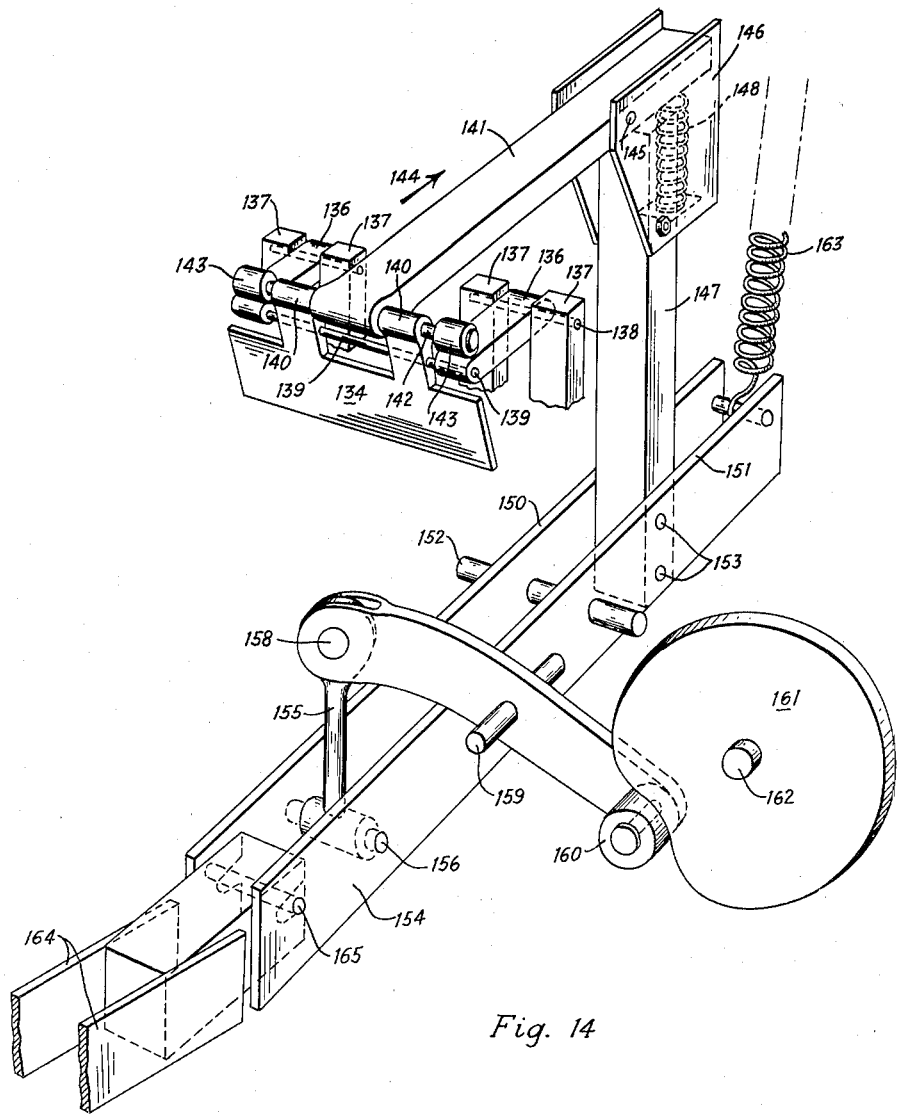
Fig. 14 is a perspective view of the mechanism for forming one end wall.

The construction and operation of the folding blades 134 are best illustrated by reference to Fig. 14.

A pair of links 136 is hingedly mounted to posts 137 at a hinge axis 138. The posts 137 are in back of the plane of the die walls 93 and 94 and are visible in Figure 6.

Figure 17:
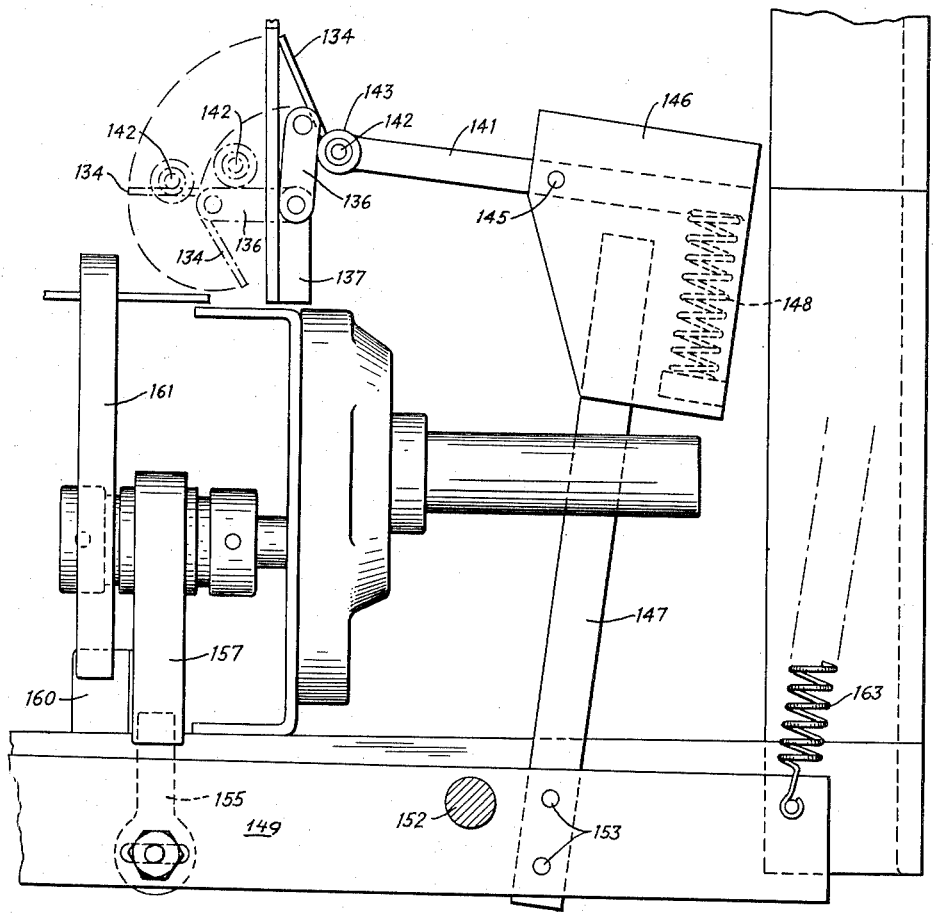
Fig. 17 illustrates the action of the hollow end walling mechanism of the machine.

The folding blade 134 is hingedly mounted to the links 136 for freedom to pivot about a tilt axis 139. The tilt axis 139 extends centrally through the body of the blade 134, so that a double armed lever results, the lower portion of which is the blade 134 proper, and the upper portion of which is a second arm 140 to which an actuating arm 141 is linked at a hinge axis 142. The hinge axis 142 is formed by a rod carrying rollers 143 at its ends. These rollers come to rest on the links 136 when the actuating arm 141 is moved in the direction of the arrow 144. In that case the rollers 143 become stops which limit the angular movement of the blade 134 with regard to the direction of the links 136. The preferred arrangement is one in which the blade 134 only forms a slight angle with respect to the link 136 when the blade is being retracted. This is illustrated in Fig. 17.

The actuating arm 141 is pivotally supported at 145 in the head 146 of a post 147. A spring 148 tends to tilt the actuating arm 141 with respect to the post 147 in a direction to swing the link 136 downwardly which is also the direction in which the blank moves through the die.

An arm 149 consisting of parallel bars 150 and 151 is pivotally mounted in the machine on a shaft 152. The post 147 is secured to the arm 149 at 153 and rocks back and forth when the near end 154 of the arm 149 moves up and down.

A connecting rod 155 is hinged to the arm 149 at 156 and is linked to one arm of a rocking lever 157 at 158. The lever 157 has a tilt axis 159, and its free end carries a roller 160 resting against the periphery of a cam 161 on a drive shaft 162.

The arm 149 is under the section of a spring 163 tending to pull the near end 154 down, thereby maintaining the roller 160 in engagement with the cam 161.

A second similarly constructed arm 164 is coupled to the arm 149 at 165 and actuates a further assembly for operating an opposite folding blade which is not visible in the figures. The opposite blade fold the opposite end wall assembly of the blank.

The operation of folding blades is best illustrated in Fig. 17 where the two extreme positions of the blade 134 are indicated together with an intermediate position. The post 147 is shown in the position in which the blade 134 is fully retracted. In this position the link 136 is upright and the roller 143 rests on the link. The upright position of the blade 134 is maintained by the spring 148 tending to tilt the arm 141 downwardly.

As the arm 149 tilts counterclockwisely, the post 147 and the arm 141 move towards the die, causing the link 136 to swing into the throat of the die. After the link 136 has assumed a right angular position with respect to the die wall, further movement of the arm 141 causes the blade 134 to tilt relatively to the link and assume a position slightly inclined towards the vertical. This causes the inner end wall of the blank to fold somewhat beyond the vertical position, so as to snap past the end edges of the inner side wall panels 16 which lock the inner end wall in place.

Figure 12:
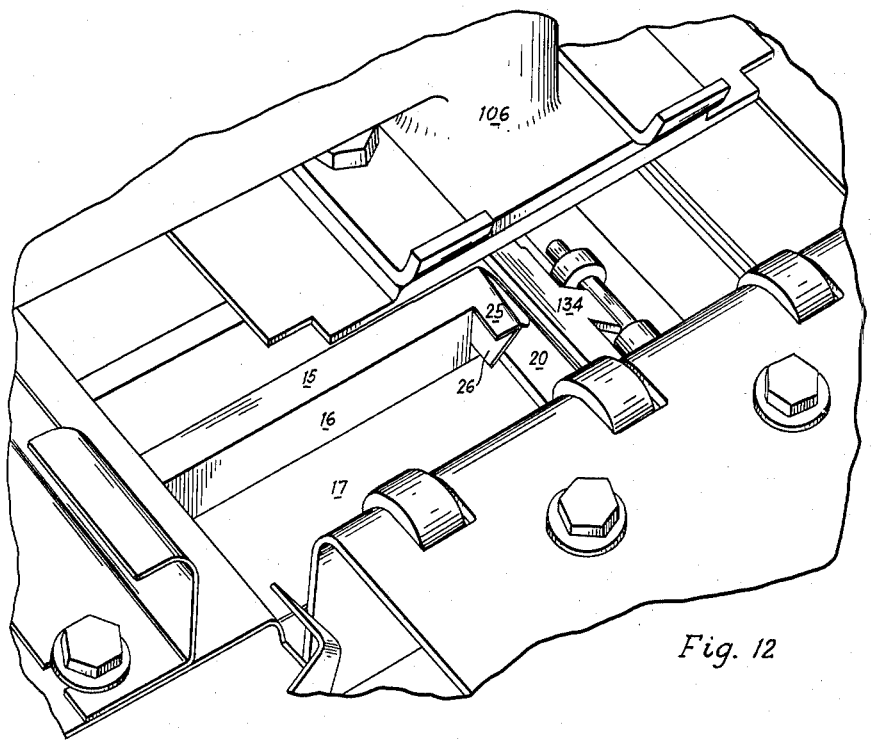
Fig. 12 shows the blank in the throat of the die, with its erected side walls boxed-in, the end wall forming mechanism beginning its folding action.

Turning now to Fig. 12, the blade 134 is shown in the intermediate position indicated in Fig. 17. The infolding of the inner end panel 22 commences at this point.

Figure 13:
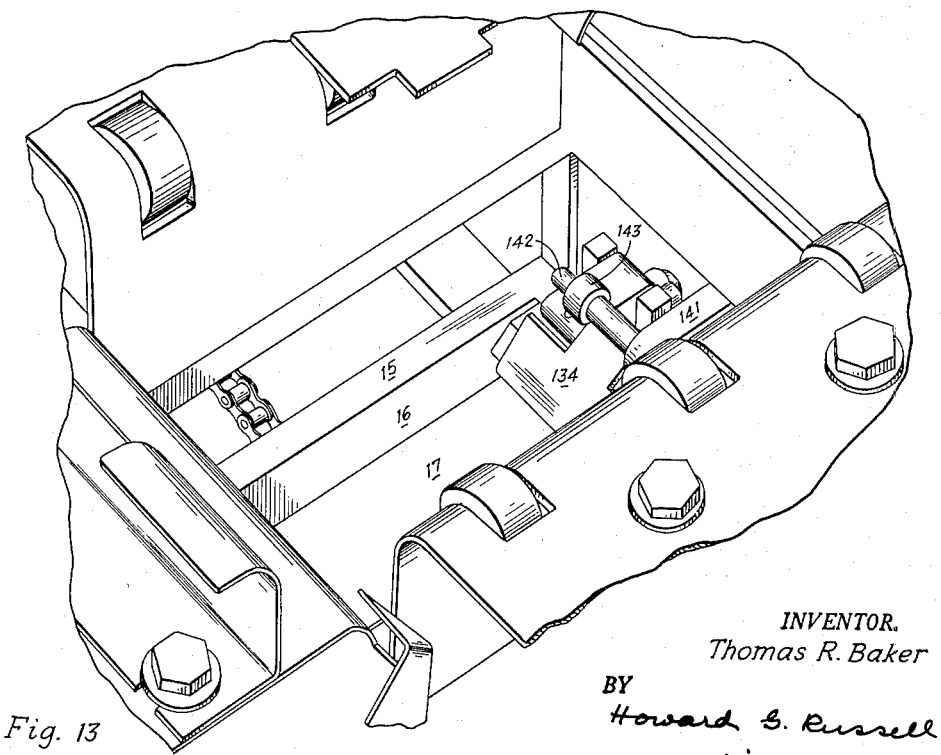
Fig. 13 shows the blank at a further advanced stage of assembly of the end walls.

Fig. 13 shows the blade 134 in a further advanced position in which the links 136 overlie the end top panel and the inner end panel 22 has almost assumed a vertical position.

After the end walls of the box are completed the end wall folding blades swing out of the throat of the die.

The finished box rests on the rails 166, 167 and is grasped by the lugs 168 of a conveyor 169 (Fig. 15) which moves the box to the end of the rails where the box drops into a suitable chute or receptacle (not shown).

Figure 3:
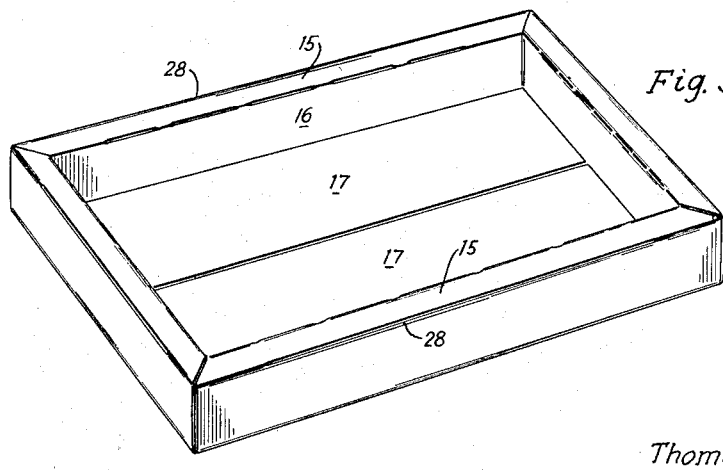
Fig. 3 is a perspective view of the completed box.

The completed box is shown in Fig. 3 and is ready for filling with merchandise.

What is claimed is:

1. A device for setting up hollow end walls of a box blank having a main panel and squared hollow side walls along side edges of the main panel, the end walls consisting of an outer end panel articulated to the end of the main panel, a top end panel articulated to the outer end panel, and an inner end panel articulated to the top end panel, the device comprising a pair of opposed first wall engaging elements engaging, and maintaining squared, said hollow side walls; a pair of opposed second wall engaging elements for maintaining said outer end walls upright with respect to said main panel; a link hingedly mounted with respect to each of said second elements and movable over, and away from, the space above said main panel; a pair of folding blades for engaging said inner end panels, each of said folding blades being hingedly mounted on one of said links; and power means for hingedly moving said links about their hinge axes with regard to said second elements, and for moving said blades with regard to said links, in succession.

2. A device for setting up hollow end walls of a box blank having a main panel and squared hollow side walls along side edges of the main panel, the end walls consisting of an outer end panel articulated to the end of the main panel, a top end panel articulated to the outer end panel, and an inner end panel articulated to the top end panel, the device comprising a die including a first pair of opposed substantially vertical die walls engaging, and maintaining squared, said hollow side walls, and a second pair of opposed substantially vertical die walls engaging at least said outer end walls and maintaining the outer end walls upright with respect to said main panel; a pair of links hingedly mounted with respect to said die and movable into, and out of, the space between said second die walls, each of said links being hinged about an axis substantially parallel to, and outside of, said second die walls; a folding blade hingedly mounted to each of said links; and power means for moving said links about their hinge axes with respect to said die and for moving said blades with regard to their respective links.

3. A device for setting up hollow end walls of a box blank having a main panel and squared hollow side walls along side edges of the main panel, the end walls consisting of an outer end panel articulated to the end of the main panel, a top end panel articulated to the outer end panel, and an inner end panel articulated to the top end panel; the device comprising a pair of opposed first wall engaging elements engaging, and maintaining squared, said hollow side walls; a pair of opposed second wall engaging elements for maintaining said outer end walls upright with respect to said main panel; a link hingedly mounted with respect to each of said second elements and movable over, and away from, the space above said main panel; a double armed folding blade for engaging said inner end panel, said folding blade hingedly mounted on said link about a tilt axis so that the blade proper constitutes one arm of a double armed lever, there being another arm; a push rod hingedly connected to said other arm; and an operating member movable towards, and away from, said second elements, said operating member having hinged engagement with said push rod.

4. A device for setting up hollow end walls of a box blank having a main panel and squared hollow side walls along side edges of the main panel, the end walls consisting of an outer end panel articulated to the end of the main panel, a top end panel articulated to the outer end panel, and an inner end panel articulated to the top end panel, the device comprising, a die including a first pair of opposed substantially vertical die walls engaging, and maintaining squared, said hollow side walls, and a second pair of opposed substantially vertical die walls engaging at least said outer end walls and maintaining the outer end walls upright with respect to said main panel; a pair of links hingedly mounted with respect to said die and movable into, and out of, the space between said second die walls, each of said links being hinged about an axis substantially parallel to, and outside of, said second die walls; a double armed folding blade for engaging said inner end panel, said folding blade being hingedly mounted on said link about a tilt axis so that the blade constitutes one arm of a double armed lever, there being another arm; a push rod hingedly connected to said other arm; a pivotally supported bell crank lever hingedly connected to said push rod; spring means for biasing said push rod in a direction assisting the downfolding of the inner end wall panel by the blade; and a cam for rocking said bell crank lever about its pivot.

5. A device for setting up hollow end walls of a box blank having a main panel and squared hollow side walls along side edges of the main panel, the end walls consisting of an outer end panel articulated to the end of the main panel, a top end panel articulated to the outer end panel, and an inner end panel articulated to the top end panel, the device comprising a die including a first pair of opposed substantially vertical die walls engaging, and maintaining squared, said hollow side walls, and a second pair of opposed substantially vertical die walls engaging at least said outer end walls and maintaining the outer end walls upright with respect to said main panel; a pair of links hingedly mounted with respect to said die and movable into, and out of, the space between said second die walls, each of said links being hinged about an axis substantially parallel to, and outside of, said second die walls; a double armed folding blade for engaging said inner end panel, said folding blade being hingedly mounted on said link about a tilt axis so that the blade constitutes one arm of a double armed lever, there being another arm; means for limiting the angular movement of said blade with respect to said link; a push rod hingedly connected to said other arm and extending substantially transverse to the die axis; an operating member movable towards, and away from, said second elements, said operating member having hinged engagement with said push rod: and means for biasing said push rod with regard to its axis of hinged engagement to said operating member, the direction of bias being the direction in which blanks move through the die.

6. A device for setting up hollow end walls of a partially erected box blank having a main panel, hollow side walls articulated to said main panel along its side edges and end wall assemblies articulated to said main panel along its end edges, each assembly comprising an outer end wall panel articulated to the main panel, a top end panel articulated to the outer end panel and an inner end panel articuated to said top end panel, the device comprising, a form enclosing the partially erected box blank and engaging box side walls in squared and erected position and engaging the said outer end walls in a position in which the outer end walls are upright with respect to said main panel; a pair of links hingedly mounted on said form for freedom to swing into, and out of, the form, the hinge axes of the links being substantially parallel to the portions of the form which engage said outer end walls; a pair of double armed folding blades for engaging said inner end panels, each of said folding blades being hingedly connected to one of said links about a tilt axis substantially parallel to said hinge axis, so that the blade proper constitutes one arm of a double armed lever, there being another arm; and an actuating member hingediy connected to said other arm and movable towards, and away from, said form, thereby moving said blade and link into, and out of, said form and simultaneously tilting said blade relatively to said link.

7. A device for setting up hollow end walls of a partially erected box blank having a main panel, hollow side walls articulated to said main panel along its side edges and end wall assemblies articulated to said main panel along its end edges, each assembly comprising an outer end wall panel articulated to the main panel, a top end panel articulated to the outer end panel, and an inner end panel articulated to said top end panel, the device comprising, a form enclosing the partially erected box blank and engaging box side walls in squared and erected position and engaging the said outer end walls in a position in which the outer end walls are upright with respect to said main panel; a pair of links hingedly mounted on said form for freedom to swing into, and out of, the form, the hinge axes of the links being substantially parallel to the portions of the form which engage said outer end walls; a pair of double armed folding blades for engaging said inner end panels, each of said folding blades being hingedly connected to one of said links about a tilt axis substantially parallel to said hinge axis, so that the blade proper constitutes one arm of a double armed lever, there being another arm; means for limiting the angular movement of said blade with respect to said link; an actuating member hingedly connected to said other arm and movable towards, and away from, said form; and a spring acting on said actuating member.

8. A device for setting up hollow end walls of a folding box blank having a main panel and hollow side walls along the side edges of the main panel, the end walls comprising an outer end panel articulated to the end of the main panel and an inner end panel angularly foldable with respect to said outer end panel, the device comprising, a box supporting base surface, a pair of opposed inner end wall engaging blades; supporting means for engaging and supporting the box sidewalls during operation of said blades; an intermediate link member for each of said blades, said link member being tiltably mounted about a first tilt axis vertically spaced from said base surface, and tiltably supporting said blade about a second tilt axis spaced from, and substantially parallel to, said first tilt axis, and means for first tilting said link member about said first tilt axis into a position substantially parallel to, and extending over, said base surface and then tilting said blade with respect to said link member.

9. A device for setting up hollow end walls of a folding box blank having a main panel and hollow side walls along the side edges of the main panel, the end walls comprising an outer end panel articulated to the end of the main panel and an inner end panel angularly foldable with respect to said outer end panel, the device comprising, a base member having a supporting surface for engaging and supporting the main panel of said box blank during the folding operation; a pair of opposed inner end wall engaging elements; an intermediate link member for each of said elements, each link member being tiltably mounted on said base member about a first tilt axis for movement towards each other and towards the box blank said first tilt axis being vertically spaced above said supporting surface, each of said link members being hinged to one of said elements for tiltably supporting said element about a second tilt axis spaced from, and substantially parallel to, said first tilt axis; and cam means for first tilting said link members relatively to said base and towards each other over said base, and then tilting said elements relatively to said link members, the direction of movement of one element being opposed to the direction of movement of the other element.

References Cited in the file of this patent

UNITED STATES PATENTS

| | | |
|---|---|---|
| 2,458,341 | Cake | Jan. 4, 1949 |
| 2,669,167 | Behl | Feb. 16, 1954 |